(12) United States Patent
Ueda

(10) Patent No.: US 6,940,860 B2
(45) Date of Patent: Sep. 6, 2005

(54) NETWORK NODE FOR ATM TRANSMISSION SYSTEM

(75) Inventor: Hitoshi Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 987 days.

(21) Appl. No.: 09/864,216

(22) Filed: May 25, 2001

(65) Prior Publication Data

US 2001/0048684 A1 Dec. 6, 2001

(30) Foreign Application Priority Data

May 29, 2000 (JP) ......................................... 2000-158028

(51) Int. Cl.⁷ ............................................. H04L 12/56
(52) U.S. Cl. .................................... 370/395.2; 370/537
(58) Field of Search ......................... 370/351–3, 395.1, 370/409, 395.2, 395.3, 399, 397, 431, 437, 532–545

(56) References Cited

U.S. PATENT DOCUMENTS

| | | | |
|---|---|---|---|
| 5,673,262 A | 9/1997 | Shimizu | |
| 6,044,080 A | 3/2000 | Antonov | |
| 6,483,810 B1 | 11/2002 | Ono et al. | |
| 6,490,286 B1 | 12/2002 | Ono et al. | |
| 6,504,845 B1 * | 1/2003 | Petersen et al. | 370/412 |
| 6,757,254 B2 | 6/2004 | Ono et al. | |
| 2001/0003528 A1 * | 6/2001 | Matsumura | 370/535 |
| 2002/0181473 A1 | 12/2002 | Ono et al. | |

FOREIGN PATENT DOCUMENTS

| | | |
|---|---|---|
| EP | 0 868 058 | 9/1998 |
| JP | 5-183574 | 7/1993 |
| JP | 7-99541 | 4/1995 |
| JP | 8-204716 | 8/1996 |
| JP | 2953647 | 7/1999 |
| JP | 11-261571 | 9/1999 |
| JP | 11-275089 | 10/1999 |
| JP | 11-275104 | 10/1999 |
| WO | WO 99/33318 | 7/1999 |

OTHER PUBLICATIONS

E.P. Rathgeb et al., "The MainStreetXpress Core Services Node—A Versatile ATM Switch Architecture for the Full Service Network," IEEE Journal on Selected Areas in Communications, vol. 15:5, (Jun. 1997), XP000657033, pp. 795–806.

* cited by examiner

Primary Examiner—David Vincent
(74) Attorney, Agent, or Firm—Foley & Lardner LLP

(57) ABSTRACT

In one direction of transmission, an ATM switch establishes a virtual connection from any of its input ports to any of outgoing transmission links. Multiplexers receive and multiplexes user cells from the ATM switch into outbound cells having any one of all virtual channel identifiers assigned to the multiplexers and return the outbound cells to the input ports of the ATM switch, where they are routed through the virtual connections to the outgoing transmission links. In the opposite direction, the ATM switch establishes a virtual connection from any of incoming transmission links to any of its output ports. Inbound cells from the incoming links are first routed through the virtual connections in the ATM switch to demultiplexers, where they are decomposed into user cells for application to the ATM switch. Similar to the outbound cells, the inbound cells have any of the virtual channel identifiers assigned to the demultiplexers.

13 Claims, 3 Drawing Sheets

NETWORK NODE FOR ATM TRANSMISSION SYSTEM

BACKGROUND OF THE INVENTION

1. Field of the Invention

The present invention relates generally to transmission systems, and more specifically to a network node for an asynchronous transfer mode (ATM) transmission system for efficient utilization of virtual channels.

2. Description of the Related Art

FIG. 1 illustrates a prior art multiplex transmission system for an ATM network. In this prior art system a network node is comprised of a main ATM switch 10, an auxiliary ATM switch 11 and a plurality of multiplexer/demultiplexer units 12 and 13. Mux/demux units 12 and 13 are connected by respective two-way transmission lines to distant network nodes 14 and 15. In each of the mux/demux units 12,13, a plurality of virtual channel identifiers (VCIs) are respectively mapped to the identifiers of user cells which are switched through the main switch 10 in both directions of transmission. In the outgoing transmission, the VCI value of outgoing user cells from the ATM switch 10 are translated in the header translation and switching unit 11 where the cells are switched through permanent virtual connections 16 and 17 to the mux/demux units 12, 13. Each mux/demux unit uses the mapped relationships to multiplex the outgoing user cells into an outgoing cell of the corresponding VCI for transmission to the respective distant node. In the incoming direction, the process is reversed so that a plurality of user data in an incoming cell of a given VCI value are demultiplexed into a plurality of user cells of the given VCI value. The VCI value of these incoming user cells is translated in the auxiliary switch 11, where the demultiplexed incoming user cells are switched through the permanent virtual connections 16 and 17 to the main switch 10.

However, all virtual channels provided by the mux/demux units 12 and 13 are fixed and cannot be altered according to varying traffic between the nodes. The mux/demux units are standardized according to different patterns of inter-node traffic so that the number of virtual channels that can be provided by each standardized unit is varied in increments of a predetermined number. Therefore, if the number of virtual channels (or VCIs) actually required for each transmission link is smaller than the maximum number, unused virtual channels represent a significant wastage of network resource. Further, because of the fixed allocation of virtual channels, unused virtual channels of one transmission link cannot be allocated to other links.

SUMMARY OF THE INVENTION

It is therefore an object of the present invention to provide a network node that enables virtual channels to be shared among a plurality of mux/demux units so that virtual channel identifiers can be economically allocated to user cells according to the specific traffic needs of different transmission routes.

According to a first aspect of the present invention, there is provided a network node connected via transmission links to a plurality of distant nodes comprising an ATM switch for establishing a virtual connection from any one of a plurality of its input ports to any one of outgoing transmission links, and a plurality of multiplexers respectively corresponding to the distant nodes. The multiplexers receive and multiplex user cells from the ATM switch into outbound cells having any one of all virtual channel identifiers assigned to the multiplexers and supply the outbound cells to the input ports of the ATM switch.

The ATM switch can be configured to establish a virtual connection from any one of incoming transmission links to any one of a plurality of its output ports. A plurality of demultiplexers are provided corresponding respectively to the distant nodes. The demultiplexers receive and demultiplex inbound cells from the output ports of the ATM switch into user cells and supply the user cells to the ATM switch, the inbound cells having any one of all virtual channel identifiers assigned to the demultiplexers.

According to a second aspect, the present invention provides a network node connected via incoming transmission links to a plurality of distant nodes. The network node comprises an ATM switch for establishing a virtual connection from any one of the incoming transmission links to any one of a plurality of its output ports, and a plurality of demultiplexers respectively corresponding to the distant nodes, the multiplexers receiving and demultiplexing inbound cells from the output ports of the ATM switch into user cells and supplying the user cells to the ATM switch, the inbound cells having any one of all virtual channel identifiers available on the incoming transmission links.

A second switch may be provided for receiving user cells from the ATM switch and establishing a plurality of virtual connections according to destinations of the received user cells to apply the received user cells to the multiplexers.

BRIEF DESCRIPTION OF THE DRAWIGNS

The present invention will be described in detail further with reference to the following drawings, in which.

DETAILED DESCRIPTION

Figure 1:
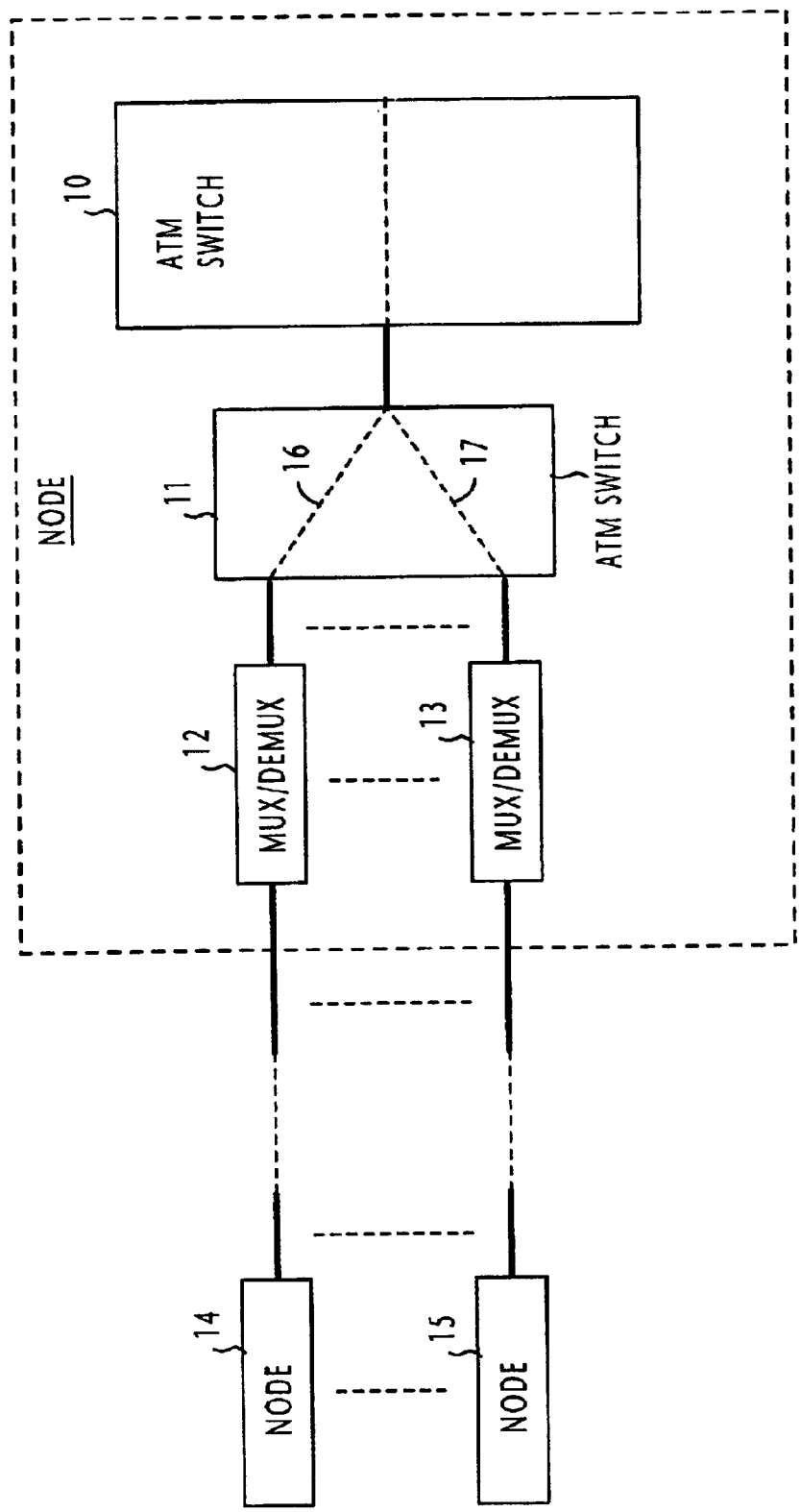
FIG. 1 is a block diagram of a prior art multiplex transmission system for ATM switching nodes.
Figure 2:
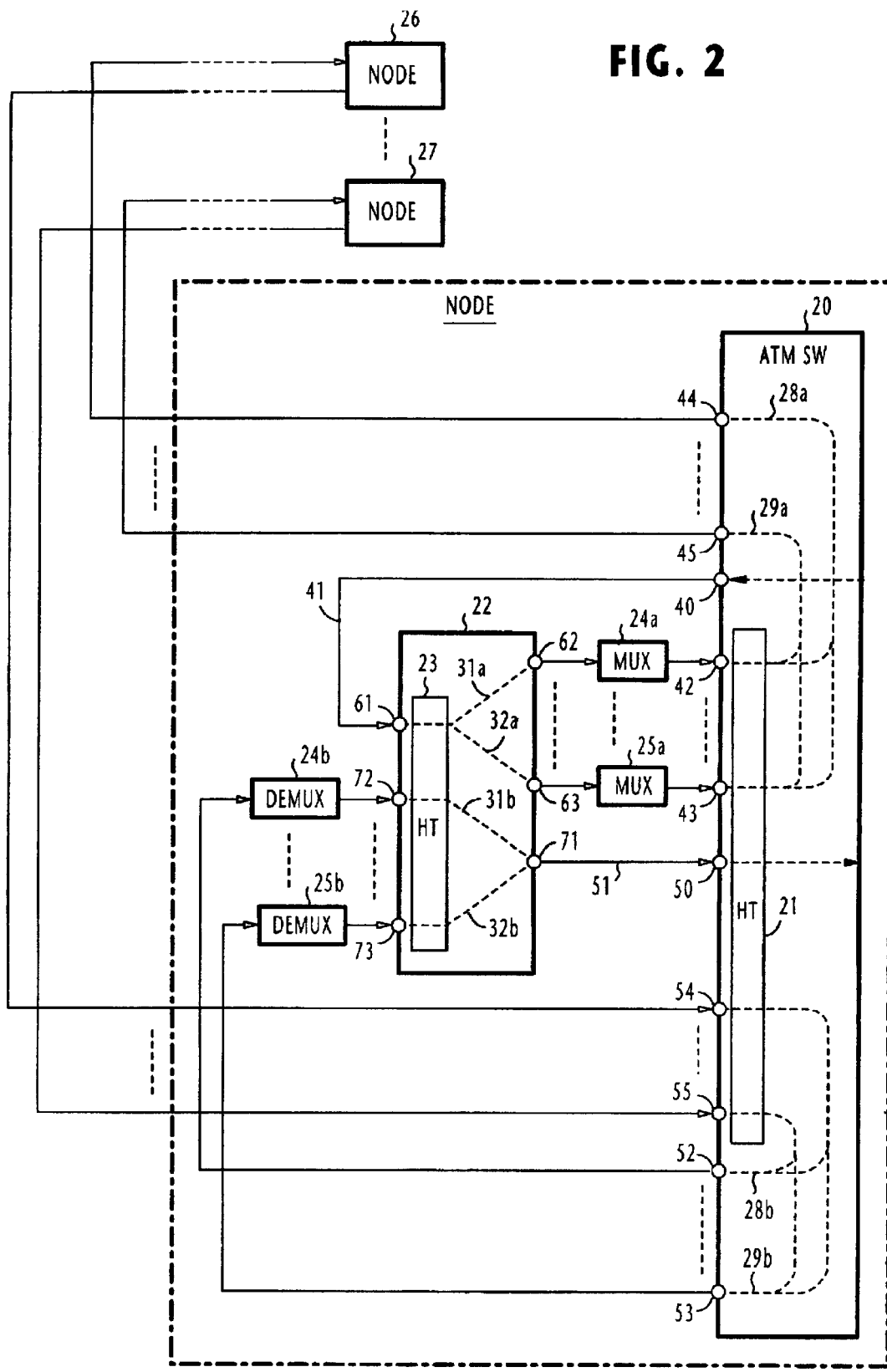
FIG. 2 is a block diagram of an ATM multiplex transmission system of the present invention.

Referring now to FIG. 2, there is shown a multiplex transmission system of the present invention. The system is comprised of an ATM node including a main ATM switch 20, an auxiliary ATM switch 22, a plurality of multiplexers 24a, 25a and a corresponding number of demultiplexers 24b and 25b. Main ATM switch 20 includes a header translator 21 at the input-port side of the switch and the auxiliary ATM switch 22 likewise includes a header translator 23 at the input port side of the switch. Multiplexers 24a and 25a are connected between output ports 62, 63 of the auxiliary switch 22 and input ports 42, 43 of the main switch 20. Demultiplexers 24b and 25b are connected between output ports 52, 53 of the main switch 20 and input ports 72, 73 of the auxiliary switch 22. Auxiliary switch 22 may be implemented as a cross-connect switch which operates as an interface for setting up relatively static virtual connections between input and output ports in response to network configuration needs.

In one direction of transmission, user ATM cells destined for the distant nodes are switched in the ATM switch 20, forming a stream of outbound cells at an output port 40 and supplied through a path 41 to an input port 60 of the auxiliary switch 22, where their VCI values are converted in the header translator 23 to appropriate values according to their destinations so that all cells of the outbound stream are switched through permanent or switched virtual connections 31a, 32a to one of output ports 62, 63 that are connected to the multiplexers 24a and 25a. Each of these multiplexers includes a mapping table (not shown) which defines unique relationships between user identifiers and any of the VCIs that are assigned to all links to destination nodes 26 and 27. The outbound user cells destined for a given distant node are multiplexed in cells of a VCI to which their user identifiers are mapped in the mapping table. In the prior art, the user identifiers of outbound user cells are multiplexed in cells of a VCI assigned only to one destination node.

The multiplexed outbound cell streams from the multiplexers 24a and 25a are applied to input ports 42 and 43 of the main switch 20, where their VCIs are converted in the header translator 21 to appropriate values which switch the outbound cells to any of output ports 44 and 45 connected respectively to distant nodes 26 and 27 via permanent or switched virtual connections 28a and 29a. Therefore, the VCIs assigned to the outgoing links to the nodes 26 and 27 are fully available for the multiplexers 24a and 25a.

In the opposite direction of transmission, the incoming links from the nodes 26 and 27 are directly coupled to input ports 54 and 55, respectively, of the main switch 20, where their VCIs are converted to appropriate values in the header translator 21 so that inbound cells from nodes 26 and 27 are switched to output ports 52 and 53 of the main switch via permanent or switched virtual connections 28b and 29b. Output ports 52 and 53 of the main switch are connected to the demultiplexers 24b and 25b. Because of the virtual connections 28b, 29b established in the main switch 20, all VCIs assigned to the incoming links are fully available for cells at the distant nodes in a manner similar to the outbound cells. User cells at the distant nodes can therefore be mapped to any VCI in their mapping table corresponding to the mapping table of the home node. The inbound cells from nodes 26 and 27 are decomposed into user cells in each of the demultiplexers, and fed into the auxiliary switch 22. After header conversion in the header translator 23, the user cells are routed through permanent or switched virtual connections 31b, 32b to an output port that is connected by a path 51 to an input port 50 of the main switch 20.

In the main and auxiliary switches 20 and 22, use of permanent virtual connections 28a, 29a, 28b, 29b, 31a, 32a, 31b, 32b is preferred if the amount of traffic is relatively constant. Otherwise, use of switched virtual connections is economically advantageous since they are established on an as-needed basis, eliminating the need of assistance from maintenance personnel.

While it is shown that all mux/demux units are connected directly to the main switch 20, it may be advantageous for system design, installation and maintenance purposes that the main and auxiliary switches are directly coupled together so that their connection to the main switch is via the auxiliary switch.

Figure 3:
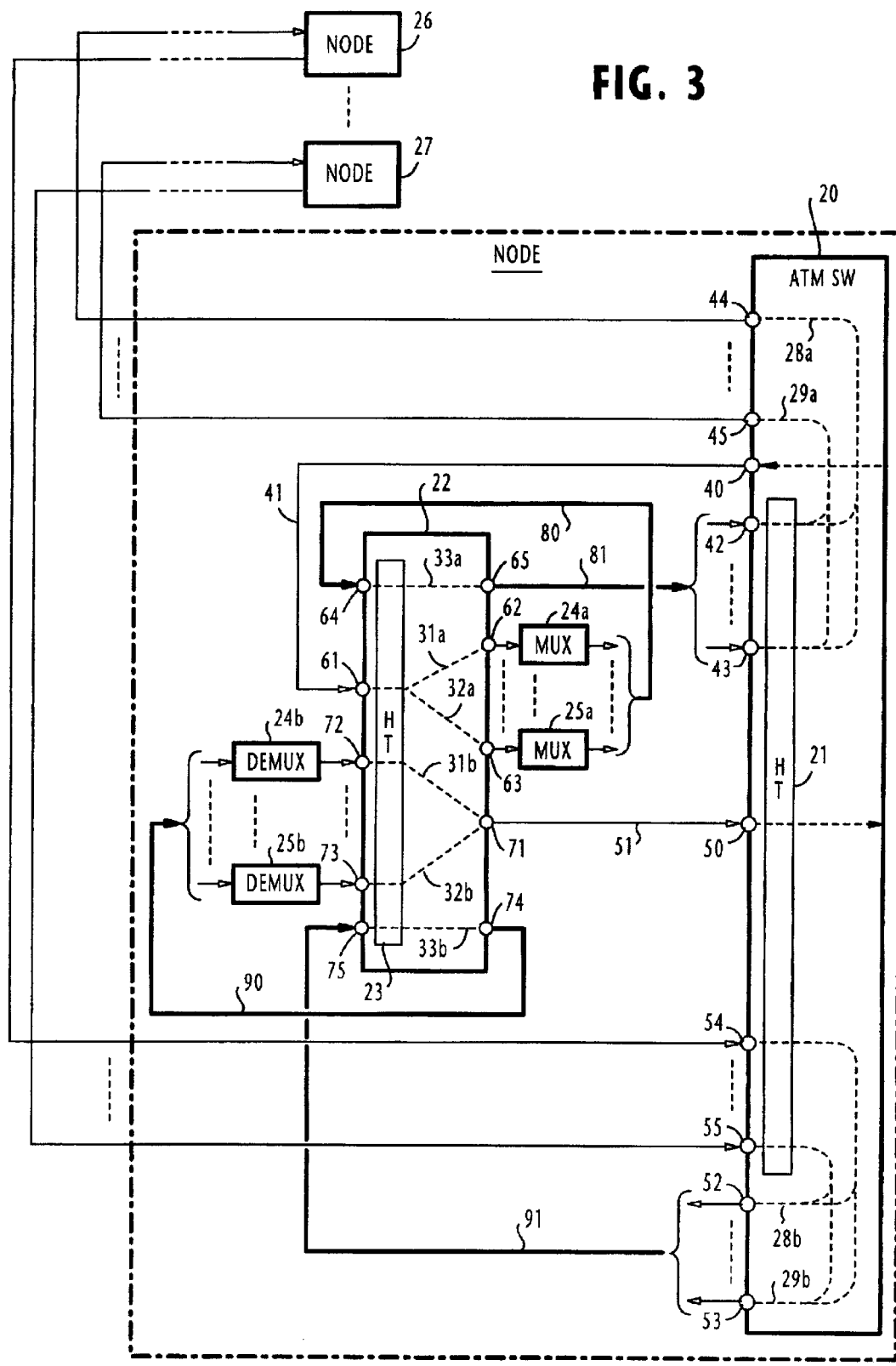
FIG. 3 is a block diagram of a modified embodiment of the system of FIG. 2.

FIG. 3 shows that the mux/demux units are connected to the main switch 20 via the auxiliary switch 22. As illustrated, the outputs of multiplexers 24a, 25a are connected via paths 80 to input ports 64 of the auxiliary switch 22, where the VCIs of outbound cells are converted in the header translator 23 so that these cells are switched through permanent or switched virtual connections 33a to output ports 65 that are connected by paths 81 to the input ports 42 and 43 of the main switch 20. For inbound cells, the output ports 54 and 55 of the main switch are coupled via paths 91 to input ports 75 of the auxiliary switch 22, where the VCIs of inbound cells are converted in the header translator 23 so that the inbound cells are routed through permanent or switched virtual connections 33b to output ports 74 that are connected by paths 90 to the demultiplexers 24b and 25b. In this way, the main and auxiliary switches are directly connected by paths 41, 51, 81 and 91.

What is claimed is:

1. A network node connected via transmission links to a plurality of distant nodes, comprising:

an ATM switch for establishing a virtual connection from any one of a plurality of input ports thereof to any one of outgoing transmission links; and a plurality of multiplexers respectively corresponding to said distant nodes, the multiplexers receiving and multiplexing user cells from said ATM switch into outbound cells having any one of all virtual channel identifiers assigned to said multiplexers and supplying the outbound cells to said plurality of input ports of the ATM switch.

2. A network node as claimed in claim 1, wherein said ATM switch is configured to establish a virtual connection from any one of incoming transmission links to any one of a plurality of output ports thereof, further comprising a plurality of demultiplexers respectively corresponding to said distant nodes, the demultiplexers receiving and demultiplexing inbound cells from said plurality of output ports of the ATM switch into user cells and supplying the user cells to said ATM switch, said inbound cells having any one of all virtual channel identifiers assigned to said demultiplexers.

3. A network node as claimed in claim 1, further comprising a second switch for receiving said user cells from said ATM switch and establishing a plurality of virtual connections according to destinations of the received user cells to apply the received user cells to said multiplexers.

4. A network node as claimed in claim 3, wherein said second switch is configured to receive the outbound cells from said multiplexers and establish a plurality of virtual connections to apply the received outbound cells to said ATM switch through the virtual connections.

5. A network node as claimed in claim 2, further comprising a second switch for receiving said user cells from said demultiplexers and establishing a plurality of virtual connections to apply the received user cells to said ATM switch through the virtual connections.

6. A network node as claimed in claim 5, wherein the second switch is further configured to receive said inbound cells from said ATM switch, and apply the received inbound cells via the second switch to said demultiplexers before receiving said user cells from said demultiplexers.

7. A network node as claimed in claim 4, wherein said virtual connections established in said ATM switch and said second switch are permanent virtual connections.

8. A network node as claimed in claim 5, wherein said virtual connections established in said ATM switch and said second switch are switched virtual connections.

9. A network node connected via incoming transmission links to a plurality of distant nodes, comprising:

an ATM switch for establishing a virtual connection from any one of said incoming transmission links to any one of a plurality of output ports thereof; and a plurality of demultiplexers respectively corresponding to said distant nodes, the demultiplexers receiving and demultiplexing inbound cells from said plurality of output ports of the ATM switch into user cells and supplying the user cells to said ATM switch, said inbound cells having any one of all virtual channel identifiers assigned to said demultiplexers.

10. A network node as claimed in claim 9, further comprising a second switch for receiving said user cells from said demultiplexers and applying the received user cells to said ATM switch.

11. A network node as claimed in claim 10, wherein the second switch is configured to receive said inbound cells from said ATM switch, and applying the received inbound cells via the second switch to said demultiplexers before receiving said user cells from said demultiplexers.

12. A network node as claimed in claim 10, wherein said virtual connections established in said ATM switch and said second switch are permanent virtual connections.

13. A network node as claimed in claim 11, wherein said virtual connections established in said ATM switch and said second switch are permanent virtual connections.

* * * * *